(12) United States Patent
Aon et al.

(10) Patent No.: US 11,032,326 B2
(45) Date of Patent: Jun. 8, 2021

(54) SYSTEMS AND METHODS FOR ACCESSING A PRIVATE NETWORK

(71) Applicant: Verizon Patent and Licensing Inc., Arlington, VA (US)

(72) Inventors: Projit Aon, Martinsville, NJ (US); Utpal Khanvilkar, Basking Ridge, NJ (US); Praveen Venkataramu, Raritan, NJ (US); Jay Tilak, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 253 days.

(21) Appl. No.: 16/012,559

(22) Filed: Jun. 19, 2018

(65) Prior Publication Data

US 2019/0387028 A1 Dec. 19, 2019

(51) Int. Cl.
*H04L 29/06* (2006.01)
*H04L 29/12* (2006.01)

(52) U.S. Cl.
CPC ........ *H04L 65/102* (2013.01); *H04L 61/3075* (2013.01); *H04L 63/0876* (2013.01); *H04L 63/0892* (2013.01); *H04L 63/10* (2013.01); *H04L 63/20* (2013.01)

(58) Field of Classification Search
CPC ... H04L 65/102; H04L 61/3075; H04L 63/20; H04L 63/0876; H04L 63/0892; H04L 63/10; H04L 63/102; H04L 63/0823; H04W 12/10; H04W 12/06
See application file for complete search history.

(56) References Cited

U.S. PATENT DOCUMENTS

| 2009/0011759 A1* | 1/2009 | Alperovich | H04Q 3/005 455/433 |
| 2013/0046976 A1* | 2/2013 | Rosati | H04W 12/069 713/168 |
| 2013/0047218 A1* | 2/2013 | Smith | H04W 12/0608 726/4 |
| 2017/0094628 A1* | 3/2017 | Miao | H04W 60/00 |
| 2018/0110081 A1* | 4/2018 | Serna | H04W 12/068 |

* cited by examiner

*Primary Examiner* — Daniel B Potratz
*Assistant Examiner* — Wansik You

(57) ABSTRACT

A device may determine whether a mobile device is associated with a first identifier that is associated with a first mobile network based on determining that a second identifier associated with the mobile device is associated with a second mobile network. The first identifier may provide authorization for the mobile device to a private network associated with the first mobile network. The device may transmit, based on determining that the mobile device is associated with the first identifier, a security challenge to the mobile device. The device may determine, based on receiving a response to the security challenge from the mobile device, whether the response to the security challenge satisfies the security challenge. The device may provide, based on determining that the response to the security challenge satisfies the security challenge, the mobile device with access to the private network.

20 Claims, 15 Drawing Sheets

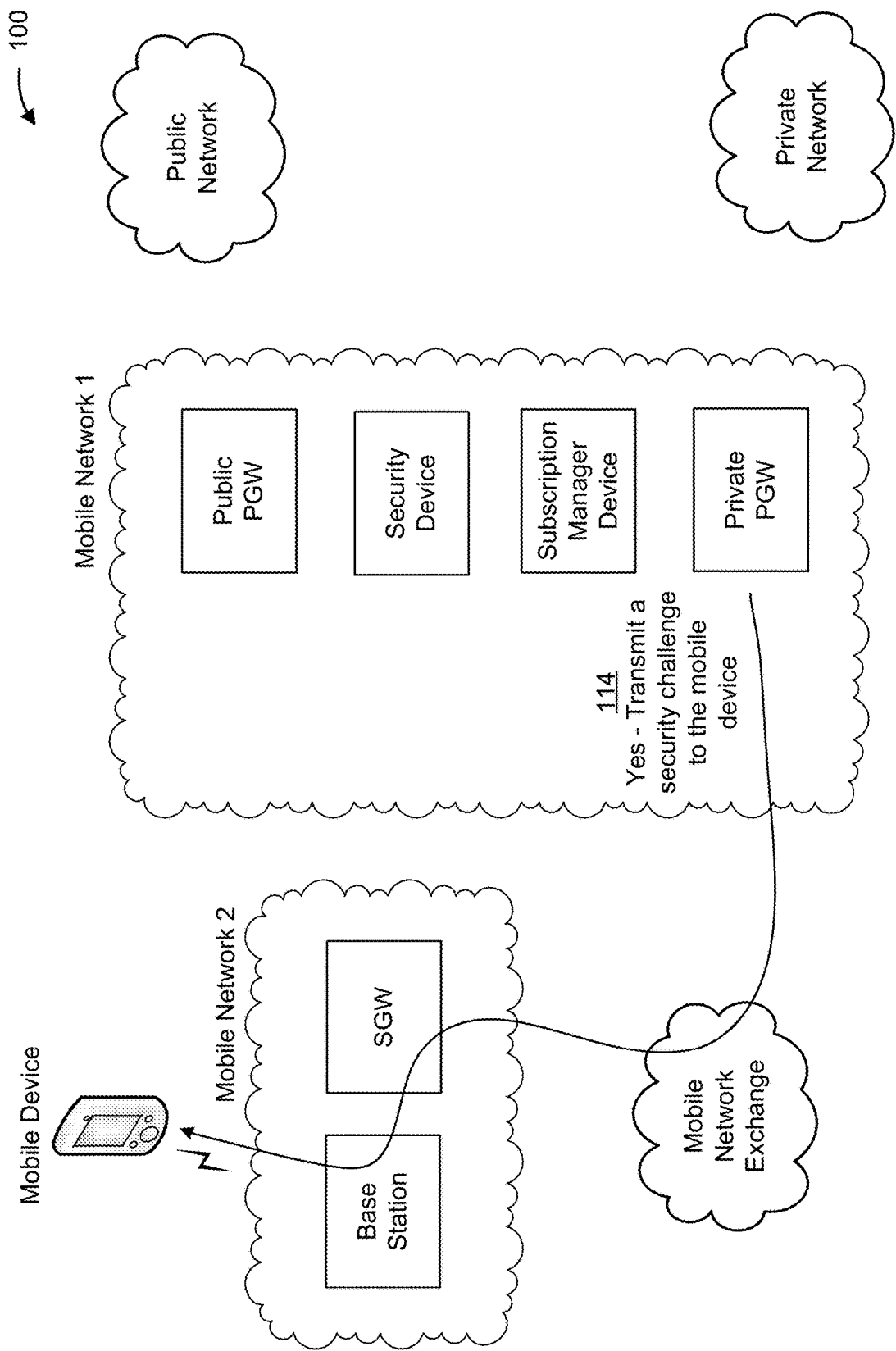

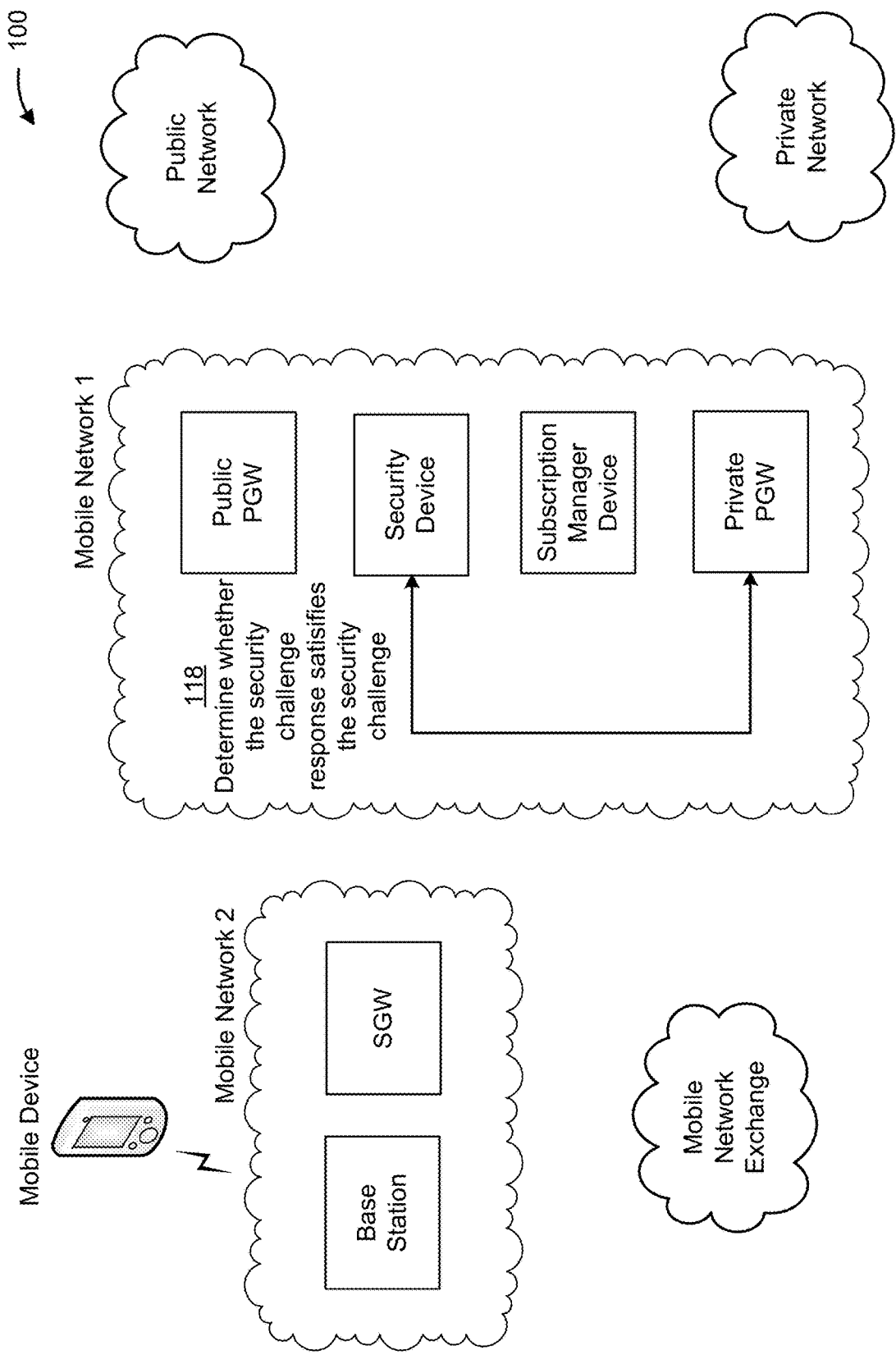

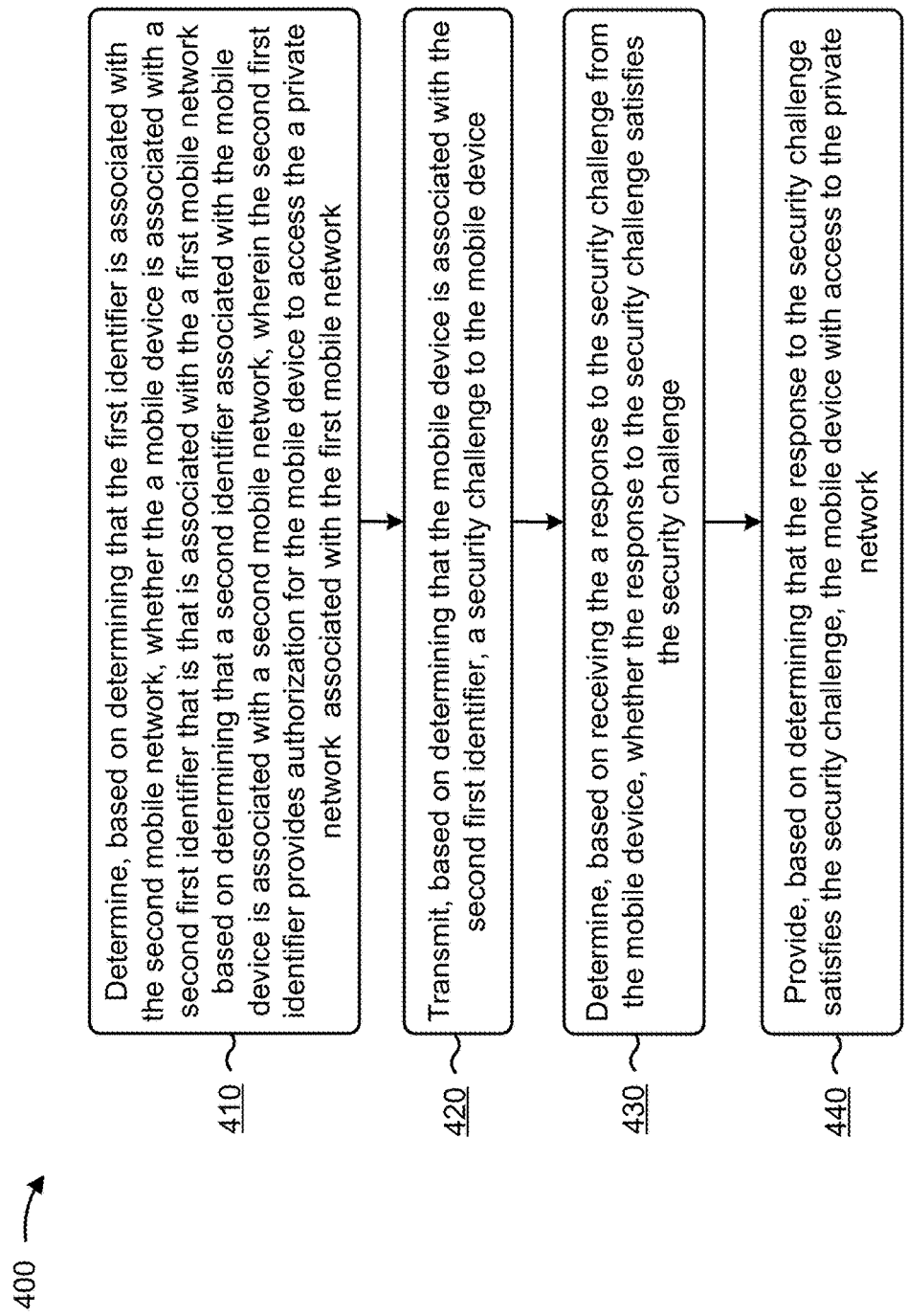

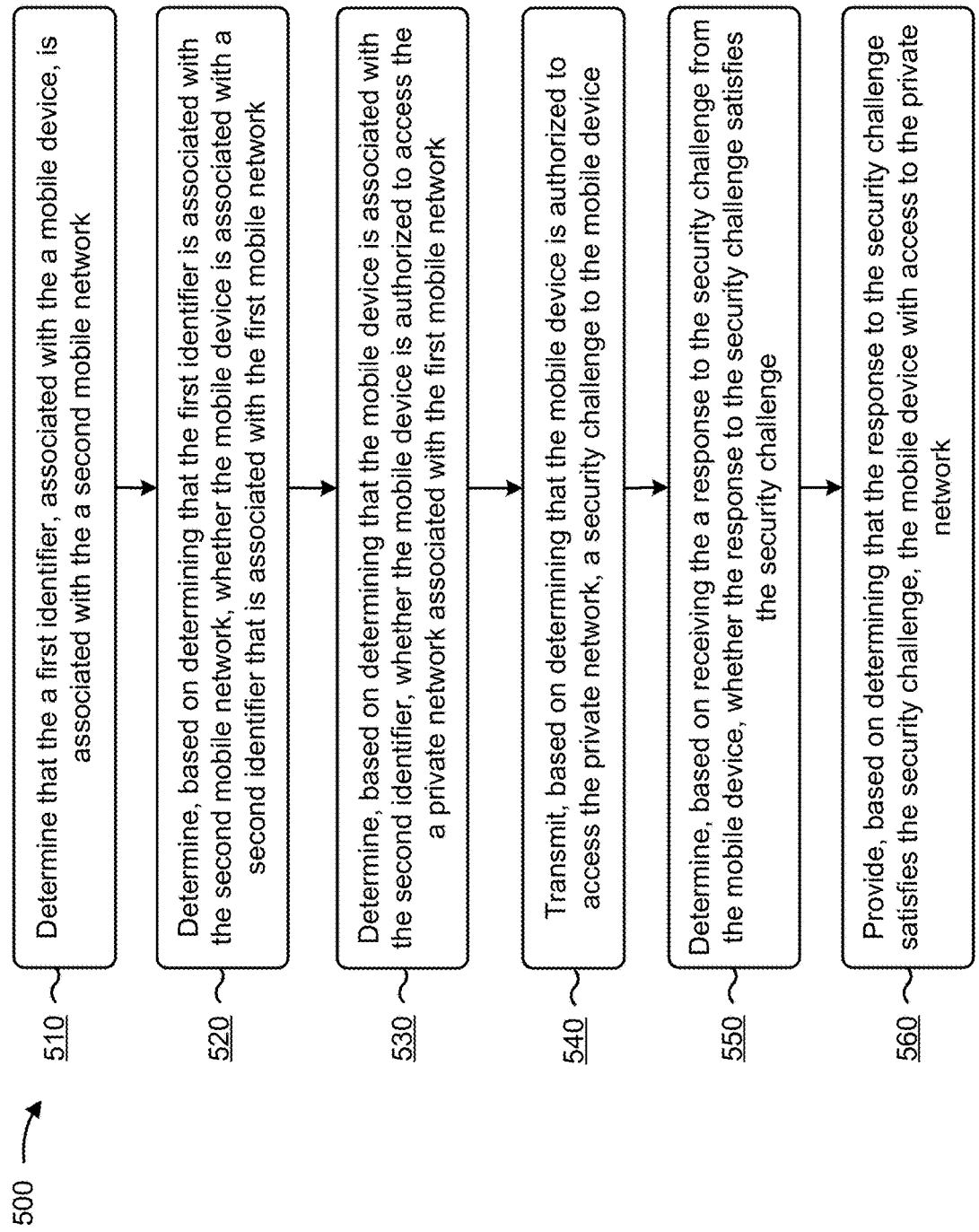

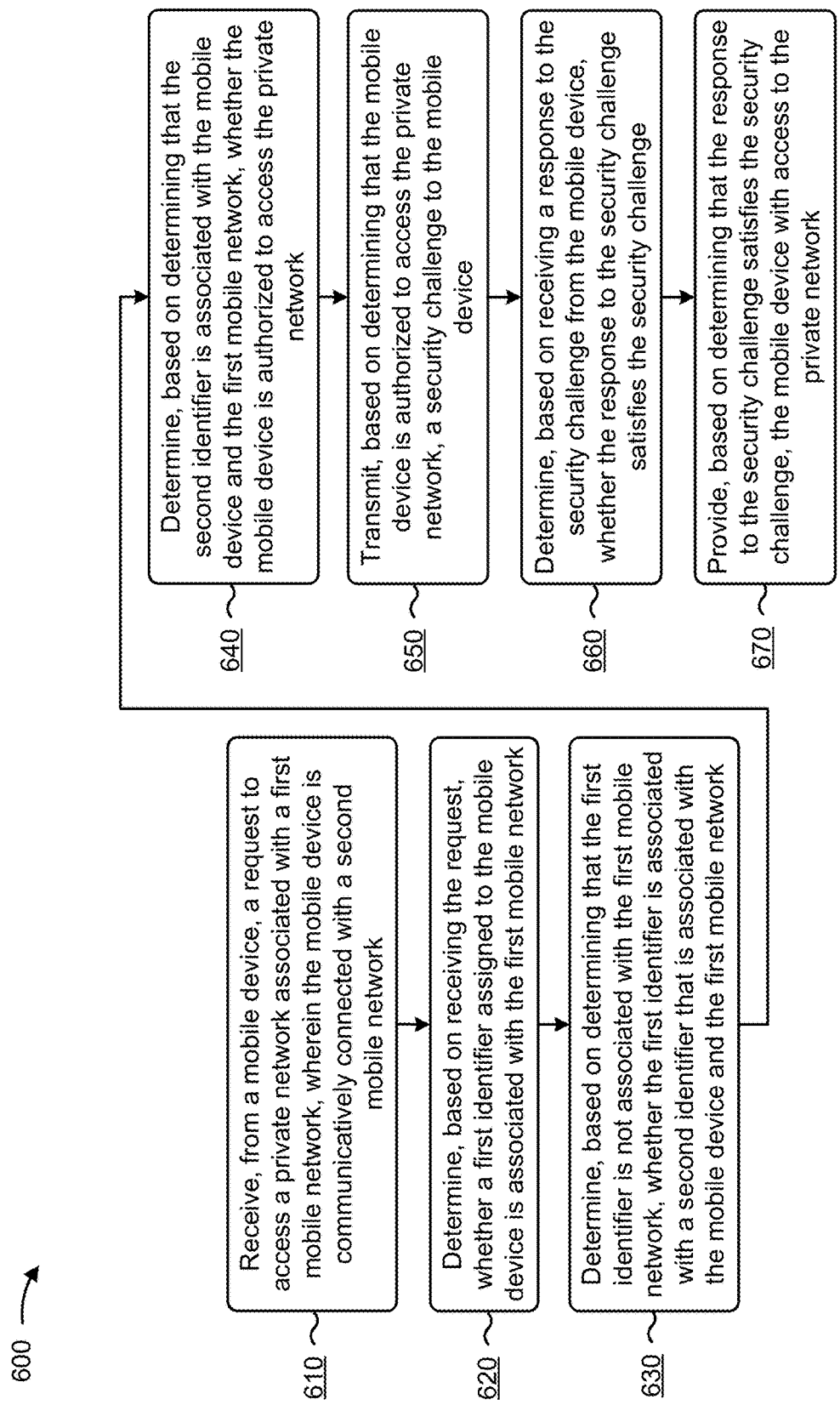

SYSTEMS AND METHODS FOR ACCESSING A PRIVATE NETWORK

BACKGROUND

A mobile private network may enable a mobile device to access a private network via a mobile network. The mobile device may use the mobile private network to transmit traffic to, and/or receive traffic from, the private network via the mobile network without the use of a public network such as the Internet.

BRIEF DESCRIPTION OF THE DRAWINGS

FIGS. 1A-1J is are diagrams of an example implementation described herein.

FIG. 4 is a flow chart of an example process for accessing a private network associated with a mobile network when on another mobile network.

FIG. 5 is a flow chart of an example process for accessing a private network associated with a mobile network when on another mobile network.

FIG. 6 is a flow chart of an example process for accessing a private network associated with a mobile network when on another mobile network.

DETAILED DESCRIPTION OF PREFERRED EMBODIMENTS

Figure 1A:
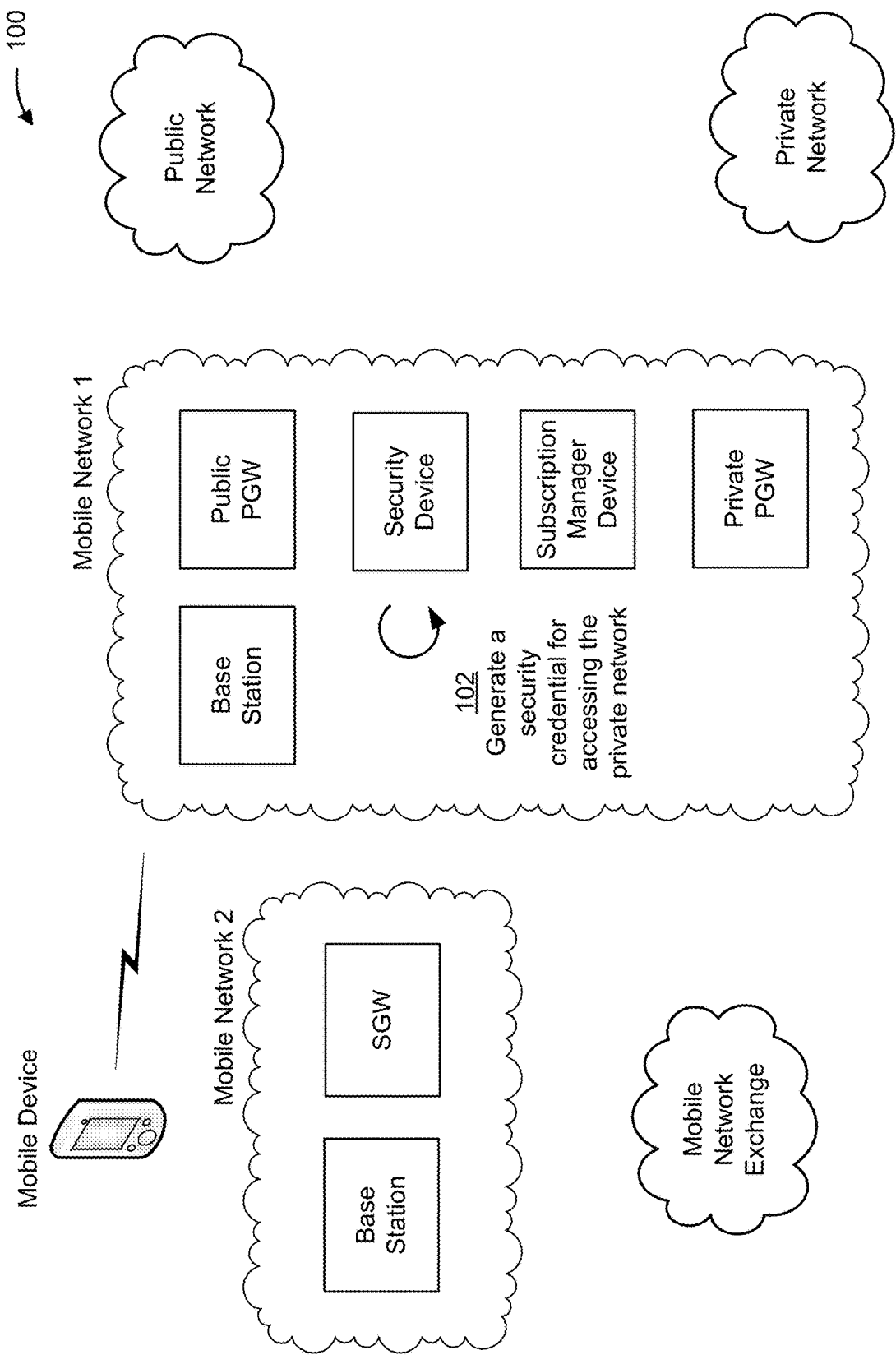

The following detailed description of example implementations refers to the accompanying drawings. The same reference numbers in different drawings may identify the same or similar elements.

A mobile network may implement a mobile private network by including a private packet data network (PDN) gateway (PGW) in the mobile network. The private PGW may provide a mobile device communicatively connected with the mobile network with access to a private network, such as an enterprise network, a local network, and/or the like. The mobile network may assign a private access point name (APN) (e.g., enterprise.mobilenetwork) to the private PGW, and the mobile device may use the private APN to access the private network via the mobile network. To access the private network, the mobile device may transmit, to a base station included in the mobile network, a request to access the private network. The request to access the private network may include information identifying the private APN, information identifying an identifier associated with the mobile device (e.g., an international mobile subscriber identity (IMSI), an international mobile equipment identity (IMEI), a mobile equipment identifier (MEID), etc.), and/or the like. The base station may receive the request, and may transmit the request to the private PGW based on identifying the private APN in the request. The private PGW may receive the request, and may determine, based on the identifier identified in the request, whether the mobile device is authorized to access the private network. If the private PGW determines that the mobile device is authorized to access the private network, the private PGW may provide the mobile device with access to the private network.

In some cases, the mobile device may access the private network while the mobile device is communicatively connected with another mobile network. For example, the mobile device may have a roaming agreement with the other mobile network. Accordingly, when a base station included in the other mobile network receives a request to access the private network from the mobile device, the base station may identify the private APN identified in the request, may determine that the private APN is associated with the mobile network, and may transmit the request to the private PGW in the mobile network via a mobile network exchange (e.g., an Internet protocol (IP) exchange (IPX), a general packet radio service (GPRS) roaming exchange (GRX), a roaming hub, etc.). Similar to above, the private PGW may receive the request and determine, based on the identifier identified in the request, whether the mobile device is authorized to access the private network.

In some cases, the mobile device may be associated with a plurality of identifiers. For example, the mobile device may include an embedded universal integrated circuit card (eUICC) that stores a plurality of IMSIs associated with the mobile device. Each IMSI may be associated with a respective mobile network. As an example, a first IMSI stored in the eUICC may be associated with the mobile network, a second IMSI stored in the eUICC may be associated with the other mobile network, and so on. Accordingly, the mobile device may use the first IMSI when communicatively connected with the mobile network, and may switch over to the second IMSI when communicatively connected with the other mobile network. In this way, the mobile device may be associated with a mobile plan for the mobile network and another mobile plan for the other network, such that the mobile device does not roam when on the other mobile network.

In some cases, being associated with a plurality of IMSIs may cause the mobile device to be unable to access the private network when communicatively connected with the other mobile network. As described above, when the mobile device is communicatively connected with the other mobile network, the mobile device may use the second IMSI associated with the other mobile network. When the mobile device tries to access the private network when communicatively connected with the other mobile network, the base station in the other mobile network may receive a request that includes information identifying the private APN and information identifying the second IMSI, and may transmit the request to the private PGW based on the private APN identified in the request. The private PGW may receive the request and may determine, based the second IMSI identified in the request, whether the mobile device is authorized to access the private network. Since the second IMSI is associated with the other mobile network, the private PGW may determine that the mobile device is not authorized to access the private network. Accordingly, the private PGW may deny the mobile device's request to access the private network.

Some implementations described herein provide a device capable of providing a mobile device with access to a private network associated with a first network (i.e., a first mobile network that provides a mobile private network for the private network) while the mobile device is communicatively connected with a second mobile network. In some implementations, the device may receive, from the mobile device, a request to access the private network associated with the first mobile network. The device may identify, based on receiving the request, a first identifier associated with the mobile device, and may determine that the first identifier is associated with the second mobile network. The device may determine, based on determining that the first identifier is associated with the second mobile network, whether the mobile device is associated with a second identifier that is associated with the first mobile network. In some implementations, the second identifier may provide authorization for the mobile device to access the private network. The device may transmit, based on determining that the mobile device is assigned to the second identifier, a security challenge to the mobile device, and may receive, from the mobile device, a response to the security challenge. The device may determine, based on receiving the response to the security challenge, whether the response to the security challenge satisfies the security challenge, and may provide, based on determining that the response to the security challenge satisfies the security challenge, the mobile device with access to the private network. In this way, the device is enabled to provide the mobile device with access to the private network when the mobile device includes an eUICC, or another component, that allows the mobile device to switch between a plurality of identifiers associated with the mobile device.

FIGS. 1A-1J is are diagrams of an example implementation 100 described herein. As shown in FIGS. 1A-1J, implementation 100 may include a mobile device and a plurality of networks, such as a public network, a private network, a mobile network exchange, mobile network 1, mobile network 2, and/or the like.

The mobile device may include various types of mobile devices, such as a smart phone, a tablet computer, a laptop computer, a handheld computer, a mobile gaming system, a wearable communications device (e.g., a smart wristwatch, a pair of smart eyeglasses), and/or the like. In some implementations, the mobile device may include a component, such as an eUICC, that allows the mobile device to be associated with a plurality of identifiers (e.g., IMSIs, IMEIs, MEIDs, etc.). Each identifier, of the plurality of identifiers, may be associated with a different mobile network. For example, a first identifier, of the plurality of identifiers, may be associated with mobile network 1, a second identifier, of the plurality of identifiers, may be associated with mobile network 2, and so on. In some implementations, the mobile device may use the first identifier when communicatively connected with mobile network 1, may use the second identifier when communicatively connected with mobile network 2, and so on.

In some implementations, the eUICC my store information associated with the plurality of identifiers associated with the mobile device. The eUICC may store a particular identifier, of the plurality of identifiers, in an issuer security domain profile (ISD-P) associated with a mobile network that is associated with the particular identifier. In some implementations, the eUICC may activate and/or deactivate an ISD-P based on a mobile network to which the mobile device is communicatively connected. For example, the eUICC may activate an ISD-P storing the first identifier associated with mobile network 1 when the mobile device is communicatively connected with mobile network 1, such that the mobile device uses the first identifier when communicatively connected with mobile network 1. As another example, when the mobile device switches over to being communicatively connected with mobile network 2, the eUICC may deactivate the ISD-P storing the first identifier, and may activate an ISD-P storing the second identifier associated with mobile network 2, such that the mobile device uses the second identifier when communicatively connected with mobile network 2.

In some implementations, the mobile device may access one or more other networks via mobile network 1 and/or mobile network 2. For example, the mobile device may access the public network, which may include a content delivery network (CDN), a public switched telephone network (PTSN), a public land mobile network (PLMN), a wide area network (WAN), a metropolitan area network (MAN), the Internet, a fiber optic-based network, a cloud computing network, and/or the like. As another example, the mobile device may access the private network, which may include various private networks, which may include an enterprise network, a local area network (LAN) (e.g., a wired LAN, a wireless LAN (WLAN, etc.)), and/or the like.

Mobile network 1 and mobile network 2 may each include a wired and/or wireless telecommunications network, Internet service provider (ISP) network, and/or the like. In some implementations, each of mobile network 1 and mobile network 2 may be associated with a different mobile network operator. The mobile network operator associated with mobile network 1 and the mobile network operator associated with mobile network 2 may have a peering agreement to exchange traffic between mobile network 1 and mobile network 2 via the mobile network exchange (e.g., IPX, GRX, roaming hub, etc.).

In some implementations, mobile network 2 may include a base station (or another type of wireless access device, such as a Wi-Fi access point, and/or the like), a serving gateway (SGW), and/or the like. The base station may provide a coverage area in mobile network 2. The mobile device may communicatively connect with mobile network 2 via the base station included in mobile network 2 when the mobile device is in the coverage area provided by the base station included in mobile network 2. The base station included in mobile network 2 may transmit traffic, received from the mobile device, to the SGW. The SGW may transmit the traffic to one or more PGWs included in mobile network 2, to the mobile network exchange, and/or the like.

In some implementations, mobile network 1 may include a base station (or another type of wireless access device, such as a Wi-Fi access point, and/or the like), a public PGW, a private PGW, a subscription manager device (e.g., a subscription manager secure routing (SM-SR), a subscription manager data preparation (SM-DP) device, etc.), a security device, and/or the like. The public PGW may be associated with the public network, and may provide the mobile device with access to the public network. For example, the mobile device may communicatively connect to mobile network 1 via the base station included in mobile network 1, and may transmit a request to access the public network to the base station included in mobile network 1. The base station included in mobile network 1 may transmit the request to the public PGW, which may provide the mobile device with access to the public network based on the request.

Similarly, the private PGW may be associated with the private network, and may provide the mobile device with access to the private network. For example, the mobile device may communicatively connect to mobile network 1 via the base station included in mobile network 1, and may transmit a request to access the private network to the base station included in mobile network 1. The base station included in mobile network 1 may transmit the request to the private PGW, which may provide the mobile device with access to the private network based on the request.

In some implementations, to direct a request to either the public network or the private network, the mobile device may include, in the request, information identifying an APN associated with either the public PGW or the private PGW. For example, to direct a request to access the public network to the public PGW, the mobile device may include, in the request, information identifying a public APN (e.g., internet.mobilenetwork1, MN1INTERNET, etc.) associated with the public PGW and information identifying the first identifier associated with the mobile device, and may transmit the request to the base station included in mobile network 1. The base station may identify the public APN identified in the request, may determine that the public APN is associated with the public PGW, and may transmit the request to the public PGW based on determining that the public APN is associated with the public PGW. As another example, to direct a request to access the private network to the private PGW, the mobile device may include, in the request, information identifying a private APN (e.g., enterprise.mobilenetwork1, MN1ENTERPRISE, etc.) associated with the private PGW and information identifying the first identifier associated with the mobile device, and may transmit the request to the base station included in mobile network 1. The base station may identify the private APN identified in the request, may determine that the private APN is associated with the private PGW, and may transmit the request to the private PGW based on determining that the private APN is associated with the private PGW.

In some implementations, before providing the mobile device with access to the private network, the private PGW may determine whether the mobile device is authorized to access the private network. In some implementations, the private PGW may determine whether the mobile device is authorized to access the private network based on the first identifier identified in the request. For example, the private PGW may access the subscription manager device to determine, based on information included in the subscription manager device, whether the first identifier, identified in the request, is authorized to use the private APN identified in the request.

The subscription manager device may be responsible for generating identifiers associated with mobile network 1, transmitting identifiers to mobile devices communicatively connected to mobile network 1, storing identifiers associated with mobile network 1 and/or identifiers associated with mobile network 2, updating identifiers associated with mobile network 1 and/or identifiers associated with mobile network 2, deleting identifiers associated with mobile network 1 and/or identifiers associated with mobile network 2, and/or the like. In some implementations, the subscription manager device may include information identifying the plurality of identifiers, associated with the mobile device, such as the first identifier associated with mobile network 1, the second identifier associated with mobile network 2, and/or the like. In some implementations, the subscription manager device may include information identifying whether an identifier (e.g., the first identifier) is associated with another identifier (e.g., the second identifier). For example, the subscription manager device may include information identifying that the first identifier and the second identifier are stored in the same eUICC on the mobile device (e.g., based on an eUICC identifier associated with the eUICC).

In some implementations, the subscription manager device may store information identifying one or more subscriptions associated with an identifier associated with mobile network 1 (e.g., the first identifier). For example, the subscription manager device may store information identifying whether the first identifier associated with the mobile device is authorized to use the public APN, the private APN, and/or the like. Accordingly, the private PGW may access the subscription manager device, may identify, in the subscription manager device, information identifying the first identifier included in the request, and may determine, based on subscription information included in the subscription manager device, whether the first identifier is associated with a subscription that allows the first identifier to use the private APN. If the first identifier is associated with the subscription that allows the first identifier to use the private APN, the private PGW may determine that the mobile device is authorized to access the private network, and may grant the mobile device with access to the private network.

As explained above, the mobile device may be associated with the plurality of identifiers, which may cause the mobile device to be unable to access the private network when communicatively connected with mobile network 2. When the mobile device is communicatively connected with mobile network 2, the mobile device may use the second identifier associated with mobile network 2. When the mobile device tries to access the private network when communicatively connected with mobile network 2, the base station included in mobile network 2 may receive a request, to access the private network, that includes information identifying the private APN and information identifying the second identifier. The base station included in mobile network 2 may identify the private APN identified in the request. The base station included in mobile network 2 may transmit, based on identifying the private APN identified in the request, the request to the SGW, which transmits the request to the private PGW via the mobile network exchange.

The private PGW may receive the request and may identify the second identifier identified in the request. The private PGW may analyze the second identifier to determine a mobile country code (MCC) identified in the second identifier (e.g., a code identifying a country in which a mobile network associated with the second identifier is geographically located), a mobile network code (MNC) identified in the second identifier (e.g., a code identifying the mobile network associated with the second identifier), a mobile subscription identification number (MSIN) identified in the second identifier (e.g., a code identifying a subscriber associated with the second identifier), and/or the like. The private PGW may determine, for example, that the MNC is not associated with mobile network 1, and therefore may determine that the mobile device is not authorized to use the private APN. Accordingly, the private PGW may deny the mobile device's request to access to the private network.

To allow the mobile device to access the private network when communicatively connected to mobile network 2, mobile network 1 may include a security device, which may be responsible for generating, storing, and/or maintaining a security credential for accessing the private network. The security credential may be an electronic security key, an electronic security token, an electronic security certificate, and/or the like, that allows the mobile device to satisfy a security challenge provided by the private PGW to the mobile device when the mobile device attempts to access the private network while communicatively connected to mobile network 2.

Turning now to FIG. 1A, and as shown by reference number 102, the security device may generate the security credential, associated with the mobile device, for accessing the private network. In some implementations, to increase security when generating the security credential, the security device may generate the security credential while the mobile device is communicatively connected to mobile network 1. For example, the security device may generate the security credential based on the mobile device connecting to mobile network 1. As another example, the security device may generate the security credential based on the mobile device successfully accessing the private network (e.g., based on the private PGW providing the mobile device with access to the private network while the mobile device is communicatively connected to mobile network 1). As a further example, the security device may generate the security credential based on receiving a request, from the mobile device while the mobile device is communicatively connected to mobile network 1, to generate the security credential.

In some implementations, the security device may generate the security credential based on various pieces of information, may randomly generate the security credential, and/or the like. For example, the security device may generate the security credential based on information identifying an eUICC identifier associated with the eUICC on the mobile device, information identifying the first identifier associated with mobile network 1, information identifying the second identifier associated with mobile network 2, and/or the like. As an example, the security credential may generate the security credential by hashing one or more of the pieces of information identified above using a hash function (e.g., a secure hash algorithm (SHA), a message digest 5 (MD5) algorithm, etc.). As another example, the security credential may generate the security credential (e.g., a public key, a private key, a digital certificate, etc.), using a public key infrastructure (PKI) based on one or more of the pieces of information identified above.

In some implementations, the security device may verify, before generating the security credential, that the first identifier associated with mobile network 1 is authorized to use the private APN to access the private network. For example, the security device may access the subscription manager device to determine whether the first identifier is associated with a subscription that allows the first identifier to use the private APN.

Figure 1B:
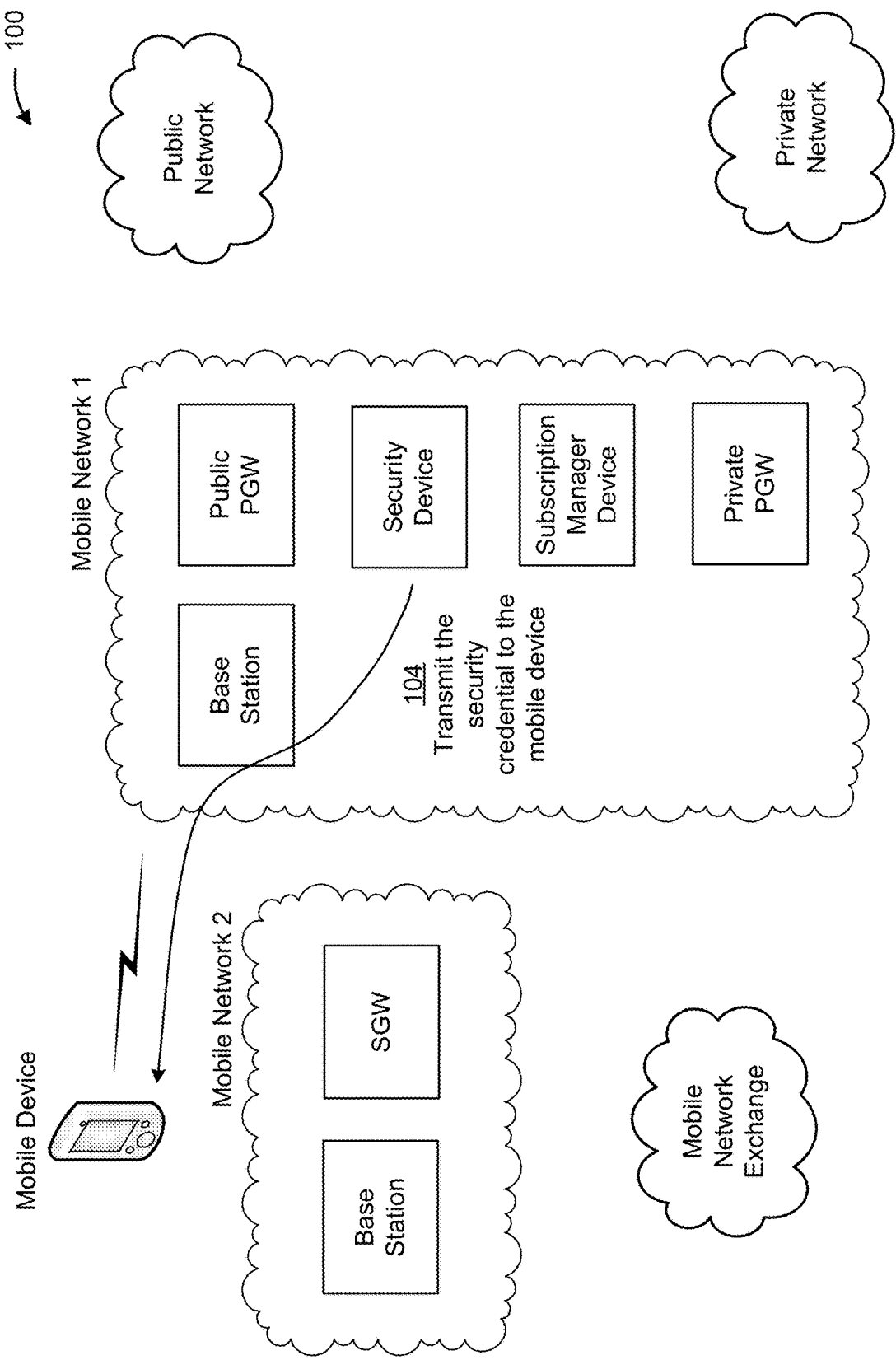

Turning now to FIG. 1B, and as shown by reference number 104, the security device may transmit the security credential to the mobile device. In some implementations, to increase security when transmitting the security credential to the mobile device, the security device may transmit the security credential to the mobile device while the mobile device is communicatively connected to mobile network 1. Accordingly, the security device may transmit the security credential to the mobile device via the base station included in mobile network 1. To further increase security associated with the security credential, the security device may encrypt the security credential before transmitting the security credential to the mobile device. In some implementations, the security device may store a copy of the security credential on the security device.

The mobile device may receive the security credential from the security device via the base station included in mobile network 1, and may store the security credential on the mobile device. For example, the mobile device may store the security credential in a security credential data store included in the eUICC, and/or another location on the mobile device.

Figure 1C:
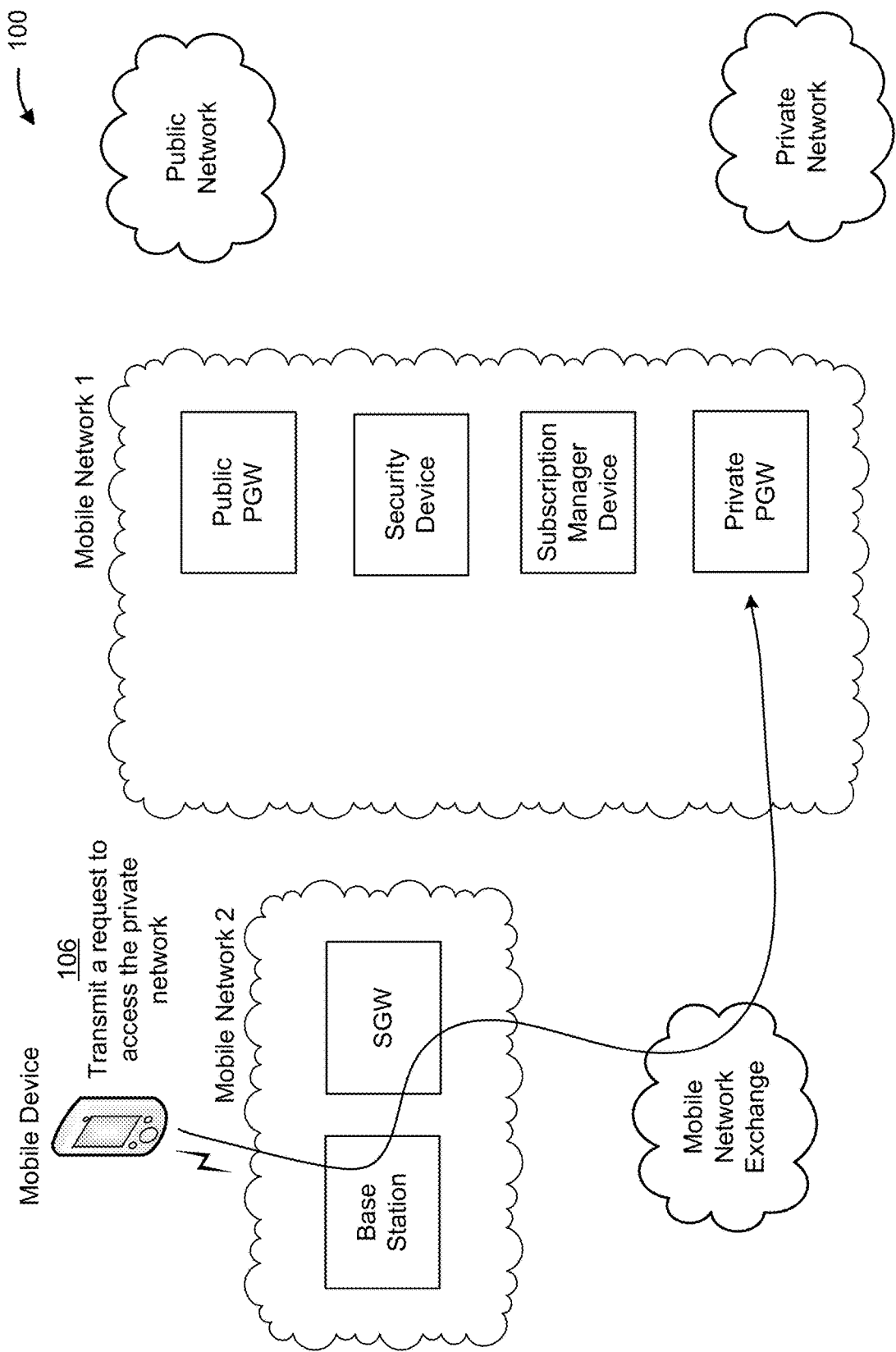

Turning now to FIG. 1C, the mobile device may switch from being communicatively connected with mobile network 1 to being communicatively connected with mobile network 2. For example, a user associated with the mobile device may travel with the mobile device to a geographic location outside of a coverage area of mobile network 1, and into a coverage area of mobile network 2. Accordingly, the mobile device may detect that the mobile device is in the coverage area of mobile network 2, and may establish a connection with the base station included in mobile network 2.

In some implementations, to establish the connection with the base station included in mobile network 2, the mobile device may provide an instruction to the eUICC to deactivate the ISD-P storing the first identifier associated with mobile network 1, and an instruction to activate the ISD-P storing the second identifier associated with mobile network 2. Accordingly, the eUICC may receive the instructions, and may deactivate the ISD-P storing the first identifier associated with mobile network 1 and may activate the ISD-P storing the second identifier associated with mobile network 2 such that the mobile device uses the second identifier when communicatively connected with mobile network 2.

As shown by reference number 106, the mobile device may attempt to access the private network while communicatively connected with mobile network 2. Accordingly, the mobile device may transmit a request to access the private network to the base station included in mobile network 2. In some implementations, the request may include information identifying the private APN associated with the private PGW, information identifying the second identifier, and/or the like.

The base station may receive the request and may identify the private APN identified in the request. Based on identifying the private APN, the base station may transmit the request to the SGW included in mobile network 2, which may transmit the request to the private PGW included in mobile network 1 via the mobile network exchange.

Figure 1D:
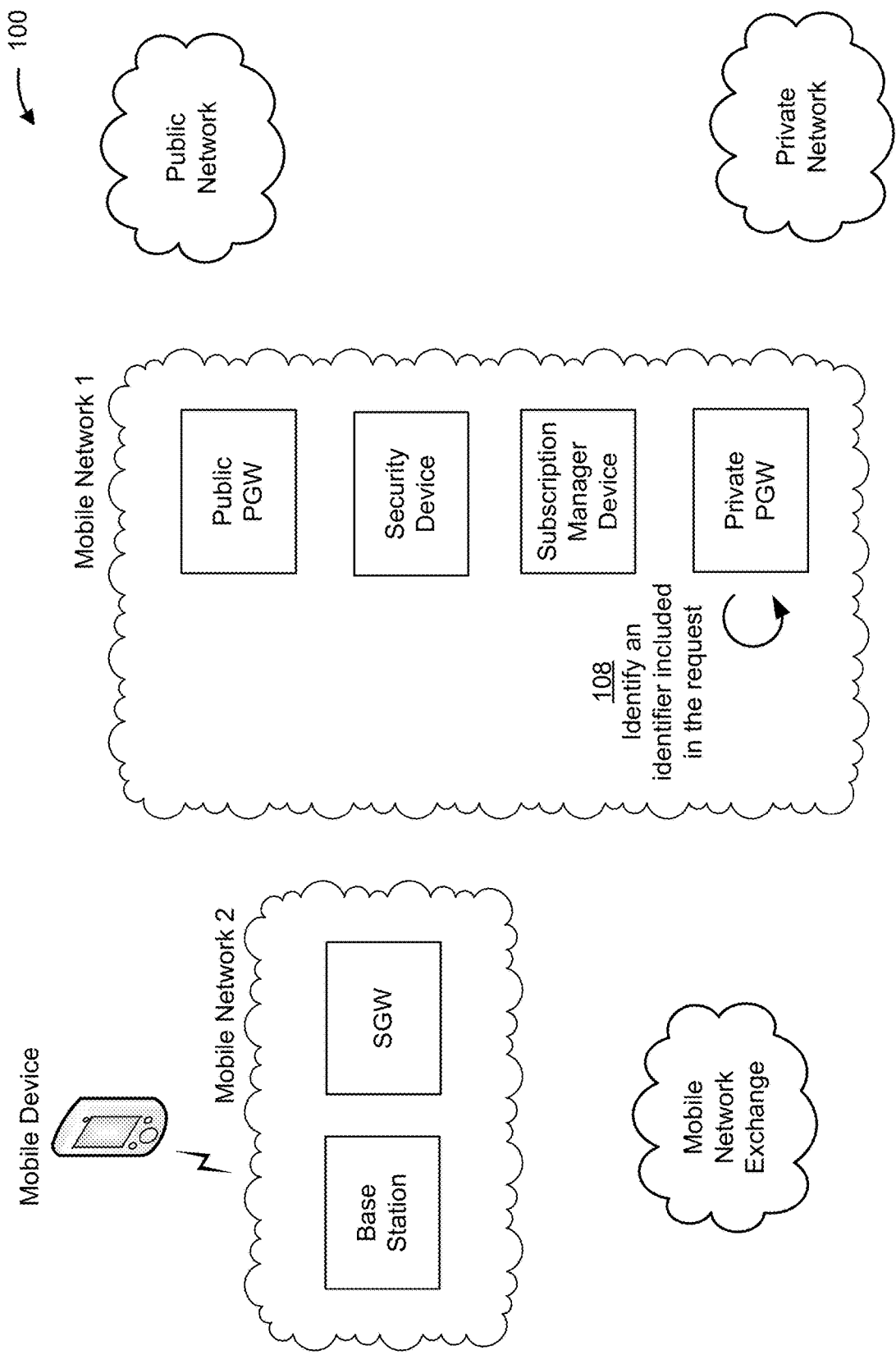

Turning now to FIG. 1D, the private PGW included in mobile network 1 may receive the request from the SGW included in mobile network 2 via the mobile network exchange. As shown by reference number 108, the private PGW may identify an identifier included in the request. For example, the private PGW may identify the second identifier included in the request.

Figure 1E:
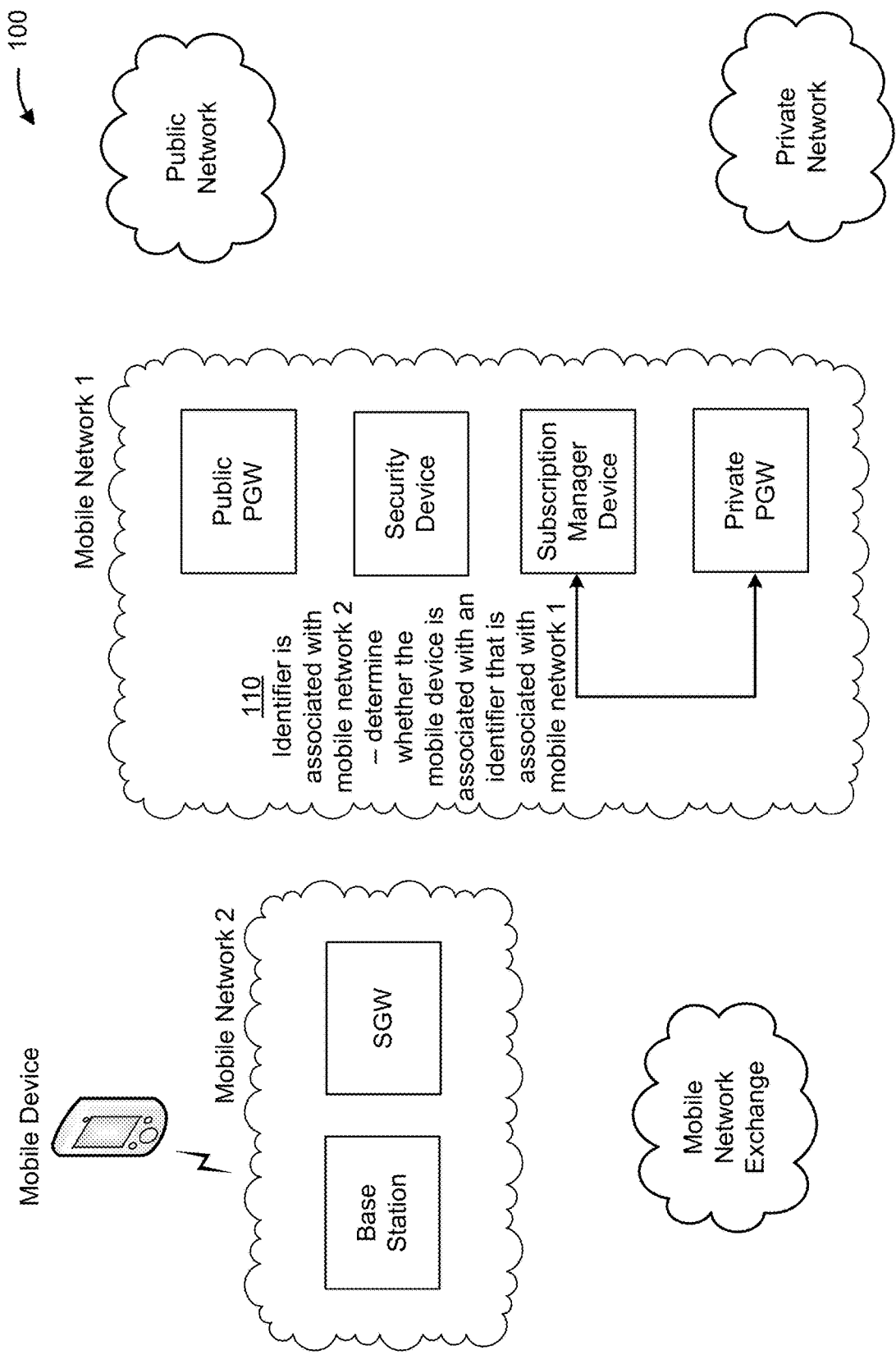

Turning now to FIG. 1E, and as shown by reference number 110, the private PGW may determine that the second identifier included in the request is associated with mobile network 2. For example, the private PGW may analyze the second identifier to determine a MCC identified in the second identifier, a MNC identified in the second identifier, a MSIN identified in the second identifier, and/or the like. The private PGW may determine that the MCC and/or MNC, identified in the second identifier, is not associated with mobile network 1 and is instead associated with mobile network 2. Accordingly, since the second identifier identified in the request is not associated with mobile network 1, the private PGW may determine that the second identifier is not authorized to use the private APN.

Based on determining that the mobile device is using an identifier associated with mobile network 2 (i.e., the second identifier), the private PGW may access the subscription manager device to determine, based on information included in the subscription manager device, whether the mobile device is associated with an identifier that is associated with mobile network 1. For example, the private PGW may determine, based on the information included in the subscription manager, that the second identifier is stored in the eUICC on the mobile device along with the first identifier associated with mobile network 1. Accordingly, the private PGW may determine that the second identifier, associated with mobile network 2, is associated with the first identifier associated with mobile network 1, which are both associated with the mobile device.

Figure 1F:
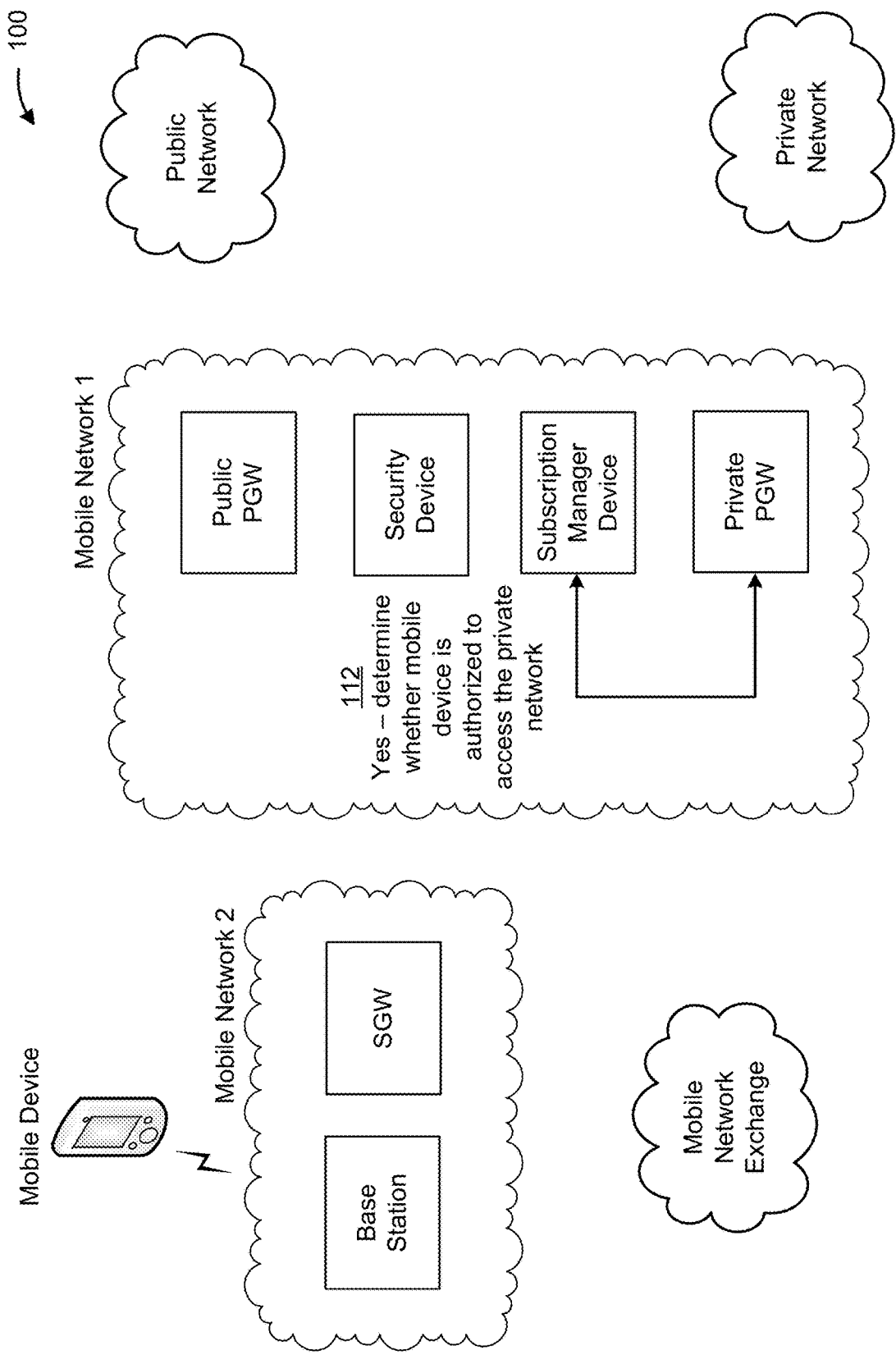

Turning now to FIG. 1F, and as shown by reference number 112, the private PGW may determine, based on determining that the mobile device is associated with the first identifier (which is associated with mobile network 1), whether the mobile device is authorized to access the private network. In some implementations, the private PGW may determine whether the mobile device is authorized to access the private network based on the first identifier. For example, the private PGW may access the subscription manager device to identify subscription information associated with the first identifier. The subscription information associated with the first identifier may identify whether the first identifier is authorized to use the private APN associated with the private PGW. The private PGW may determine that the mobile device is authorized to access the private network based on determining that the first identifier is authorized to use the private APN associated with the private PGW.

Turning now to FIG. 1G, and as shown by reference number 114, the private PGW may transmit, based on determining that the mobile device is authorized to access the private network, a security challenge to the mobile device. For example, the private PGW may transmit the security challenge to the SGW included in mobile network 2 via the mobile network exchange, the SGW may transmit the security challenge to the base station included in mobile network 2, and the base station in mobile network 2 may transmit the security challenge to the mobile device. In some implementations, the security challenge may include an instruction for the mobile device to provide the security credential (i.e., the security credential that was generated by the security device), associated with the mobile device, to the private PGW.

Figure 1H:
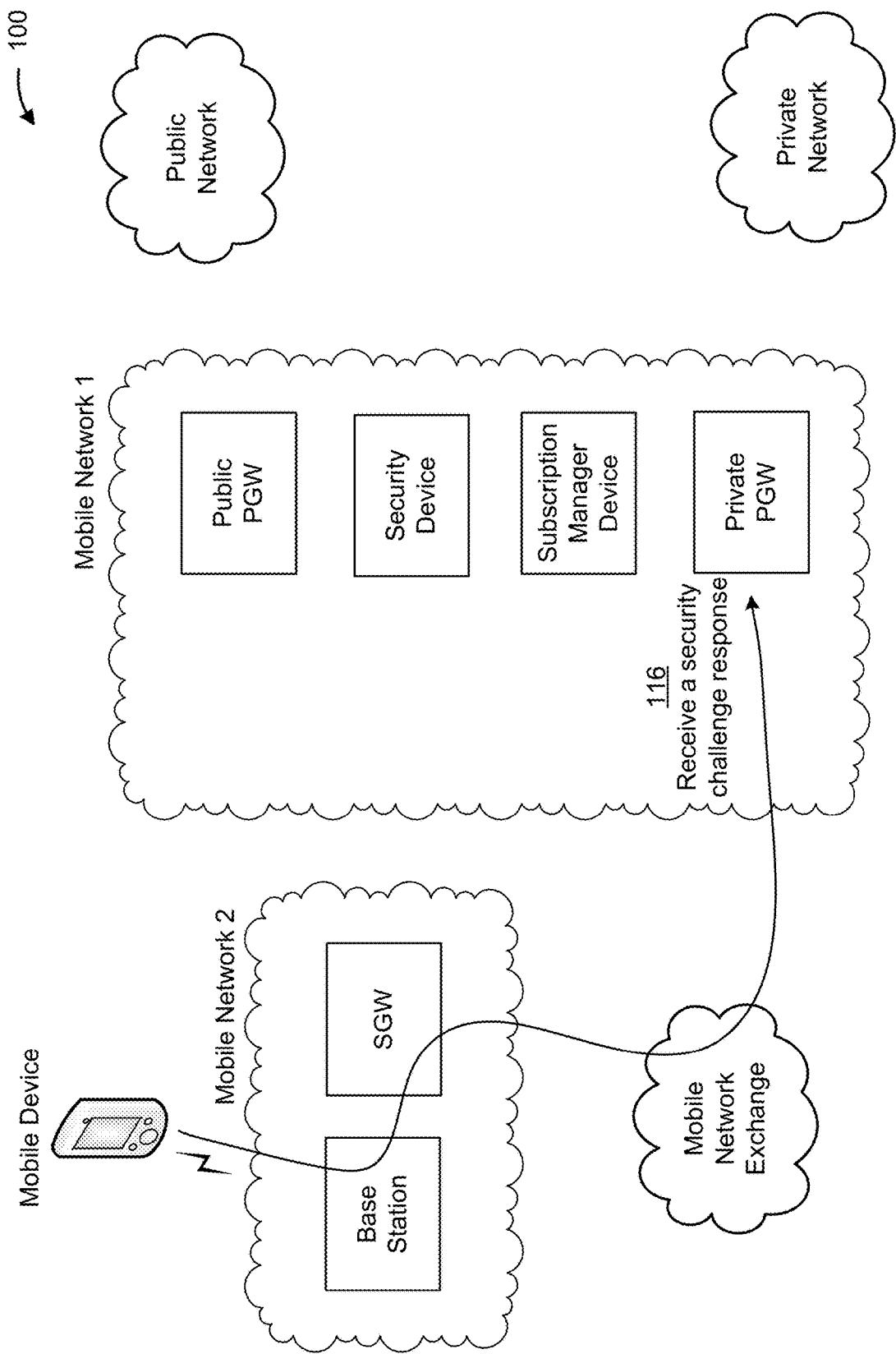

Turning now to FIG. 1H, and as shown by reference number 116, the private PGW may receive the security credential from the mobile device as the response to the security challenge. In some implementations, the mobile device may receive the security challenge from the private PGW and may, based on receiving the security challenge, obtain the security credential associated with the mobile device (e.g., from the security credential data store included in the eUICC on the mobile device, and/or another location on the mobile device). The mobile device may transmit the security credential to the private PGW as the response to the security challenge. For example, the mobile device may transmit the security credential to the base station included in mobile network 2, which may transmit the security credential to the SGW included in mobile network 2. The SGW may transmit the security credential to the private PGW via the mobile network exchange.

Turning now to FIG. 1I, and as shown by reference number 118, the private PGW may determine whether the response provided by the mobile device satisfies the security challenge. To determine whether the response provided by the mobile device satisfies the security challenge, the private PGW may access the security device to obtain the copy of the security credential that was stored on the security device when the security credential was generated.

In some implementations, the private PGW may determine whether the response satisfies the security challenge by generating a hash value (e.g., using SHA, MD5, etc.) based on the security credential provided in the response, and determining whether the generated hash value matches an expected hash value. In some implementations, the private PGW may determine whether the response satisfies the security challenge by comparing the security credential, provided by the mobile device in the response, with the copy of the security credential stored on the security device. For example, the private PGW may determine, based on the comparison, whether the security credential, provided by the mobile device in the response, and the copy of the security credential, stored on the security device, match. As an example, when the security credential and the copy of the security credential are each a security key including the exact same string of alphanumeric characters, the private PGW may determine that the response, provided by the mobile device, satisfies the security challenge. As another example, when the security credential and the copy of the security credential include a different string of alphanumeric characters (the strings do not exactly match), the private PGW may determine that the response, provided by the mobile device, does not satisfy the security challenge. In some implementations, the private PGW may decrypt the security credential prior to comparing the security credential with the copy of the security credential (e.g., using a public key associated with the mobile device and/or the private PGW, a private key associated with the mobile device and/or the private PGW, a shared key associated with the mobile device and/or the private PGW, etc.).

Figure 1J:
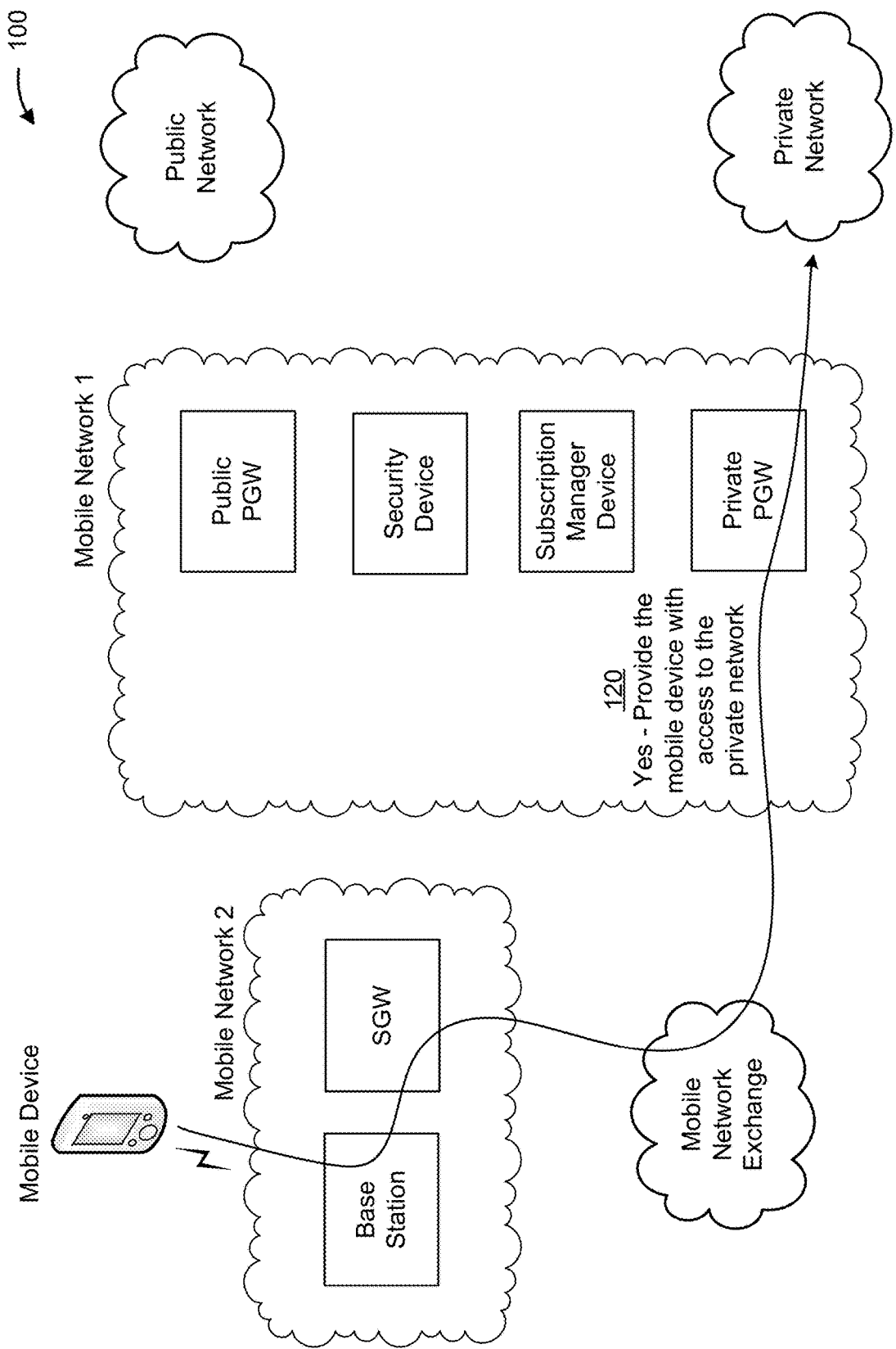

Turning now to FIG. 1J, and as shown by reference number 120, the private PGW may provide the mobile device with access to the private network based on determining that the response provided by the mobile device satisfies the security challenge. Accordingly, the mobile device may transmit to, and/or receive traffic from, the private network while communicatively connected to mobile network 2.

In this way, the private PGW may provide the mobile device with access to the private network when the mobile device includes an eUICC, or another component, that allows the mobile device to switch between a plurality of identifiers associated with the mobile device. In this way, this private PGW is capable of performing functions that could not previously be performed when the mobile device switched between a plurality of identifiers associated with the mobile device when moving between mobile networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of implementation 100 may perform one or more functions described as being performed by another set of devices of implementation 100.

Figure 2:
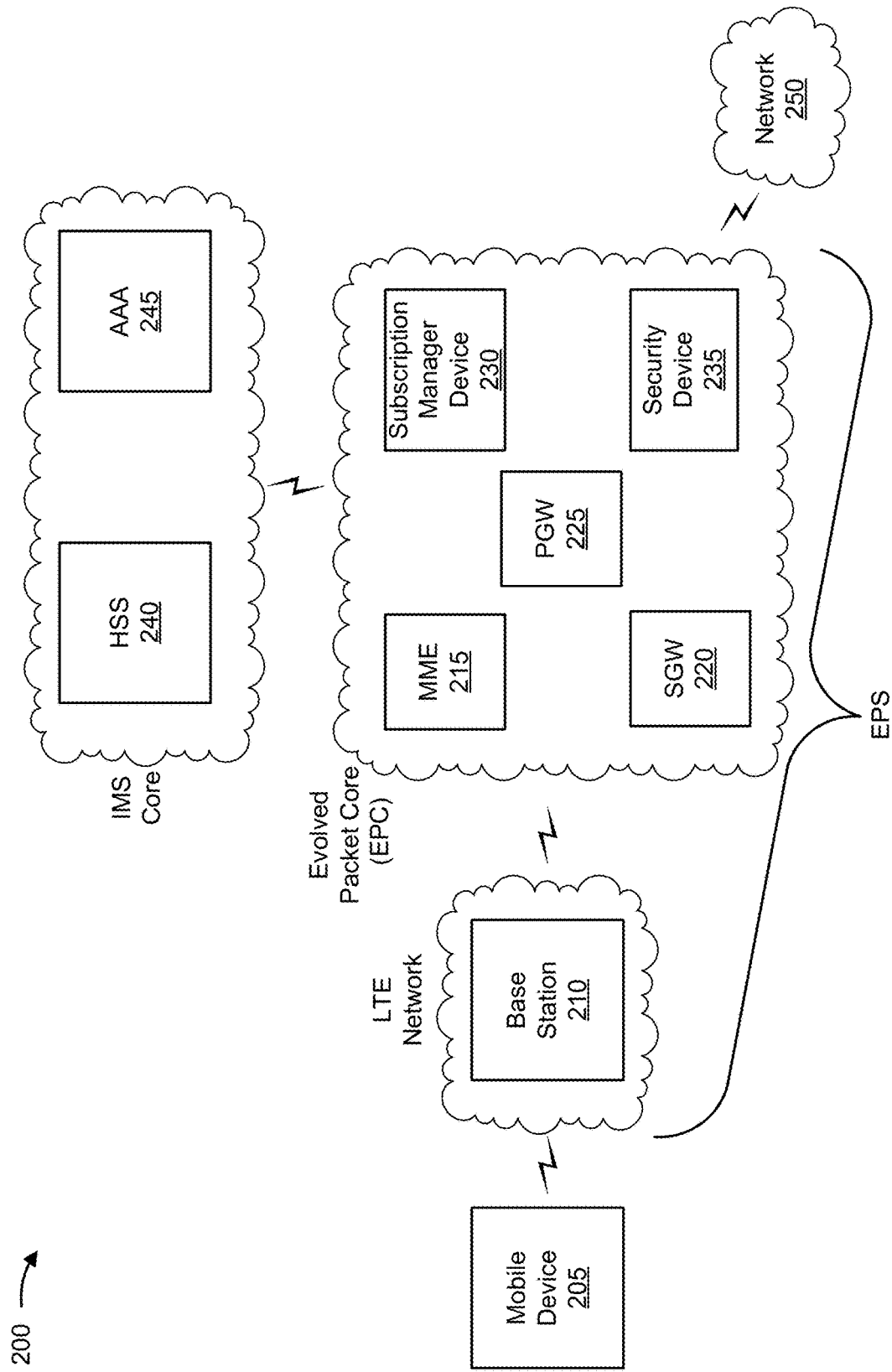
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a subscription manager device 230; a security device 235; a home subscriber server (HSS) 240; an authentication, authorization, and accounting server (AAA) 245; and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a fifth generation (5G) network, and/or the like.

Environment 200 may include an evolved packet system (EPS) that includes an LTE network and/or an evolved packet core (EPC). The LTE network may include a radio access network (RAN) that includes one or more base stations 210 that take the form of evolved Node Bs (eNBs) via which mobile device 205 communicates with the EPC. The EPC may include MME 215, SGW 220, and/or PGW 225 that enable mobile device 205 to communicate with network 250 and/or an Internet protocol (IP) multimedia subsystem (IMS) core. The IMS core may include HSS 240 and/or AAA 245, and may manage device registration and authentication, session initiation, etc., associated with mobile devices 205. HSS 240 and/or AAA 245 may reside in the EPC and/or the IMS core.

Mobile device 205 includes one or more devices capable of communicating with base station 210 and/or a network (e.g., network 250). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Mobile device 205 may send traffic to and/or receive traffic from network 250 (e.g., via base station 210, SGW 220, and/or PGW 225).

In some implementations, mobile device 205 may receive a security credential from security device 235 (e.g., via base station 210), may connect to a mobile network (e.g., via base station 210), and may transmit (e.g., via base station 210 and SGW 220) a request to access a private network. In some implementations, security device 235 may receive a security challenge from PGW 225 (e.g., via SGW 220 and base station 210), may provide a security credential to PGW 225 in response to a security challenge, may access a private network upon satisfying a security challenge, and/or the like. In some implementations, mobile device 205 may include an eUICC that stores identifiers associated with mobile device 205, each identifier associated with a respective mobile network, and may identify a particular identifier to determine a mobile network to which the mobile device is connected, is to be connected, and/or the like.

Base station 210 includes one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to mobile device 205 via base station 210. Additionally, or alternatively, SGW 220 may perform operations associated with handing off mobile device 205 to and/or from an LTE network.

PGW 225 includes one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to mobile device 205 via SGW 220 and base station 210. PGW 225 may record data usage information (e.g., byte usage), and may provide the data usage information to AAA 245.

In some implementations, PGW 225 may include a public PGW that provides mobile device 205 with access to a public network, and/or a private PGW that provides mobile device 205 with access to a private network. In some implementations, PGW 225 may receive, from mobile device 205 (e.g., via base station 210 and SGW 220), a request to access a private network, may identify an identifier in the request, may access subscription manager device 230 to determine whether mobile device 205 is authorized to access the private network, and/or the like. In some implementations, PGW 225 may transmit a security challenge to mobile device 205 (e.g., via SGW 220 and base station 210), and may receive a security credential from mobile device 205 (e.g., via base station 210 and SGW 220) in response to the security challenge. In some implementations, PGW 225 may determine whether the response satisfies the security challenge by comparing the security credential with a copy of the security credential stored on security device 235, and may provide mobile device 205 with access to a private network based on determining that the response satisfies the security challenge.

Subscription manager device 230 includes one or more devices capable of generating identifiers associated with a mobile network, transmitting identifiers to mobile devices communicatively connected to a mobile network, storing, updating, and/or deleting identifiers associated with a mobile network, and/or the like. In some implementations, subscription manager device 230 may include information identifying identifiers, information identifying whether an identifier is associated with another identifier, and/or the like. In some implementations, subscription manager device 230 may be accessed (e.g., by PGW 225) to determine whether mobile device 205 is authorized to access a private network. In some implementations, subscription manager device 230 may be included in HSS 240.

Security device 235 includes one or more devices capable of generating, storing, and/or maintaining a security credential for accessing a private network. In some implementations, security device 235 may transmit the security credential to mobile device 205. In some implementations, PGW 225 may access security device 235 to obtain a copy of the security credential to determine whether a response to a security challenge provided by mobile device 205 satisfies the security challenge (e.g., by comparing the security credential provided by mobile device 205 to the copy of the security credential stored by security device 235), and may provide mobile device 205 with access to the private network if the response satisfies the security challenge.

HSS 240 includes one or more devices, such as one or more server devices, capable of managing (e.g., receiving, generating, storing, processing, and/or providing) information associated with mobile device 205. For example, HSS 240 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 240 may provide this information to one or more other devices of environment 200 to support the operations performed by those devices.

AAA 245 includes one or more devices, such as one or more server devices, that perform authentication, authorization, and/or accounting operations for communication sessions associated with mobile device 205. For example, AAA 245 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

Network 250 includes one or more wired and/or wireless networks. For example, network 250 may include a telecommunications network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
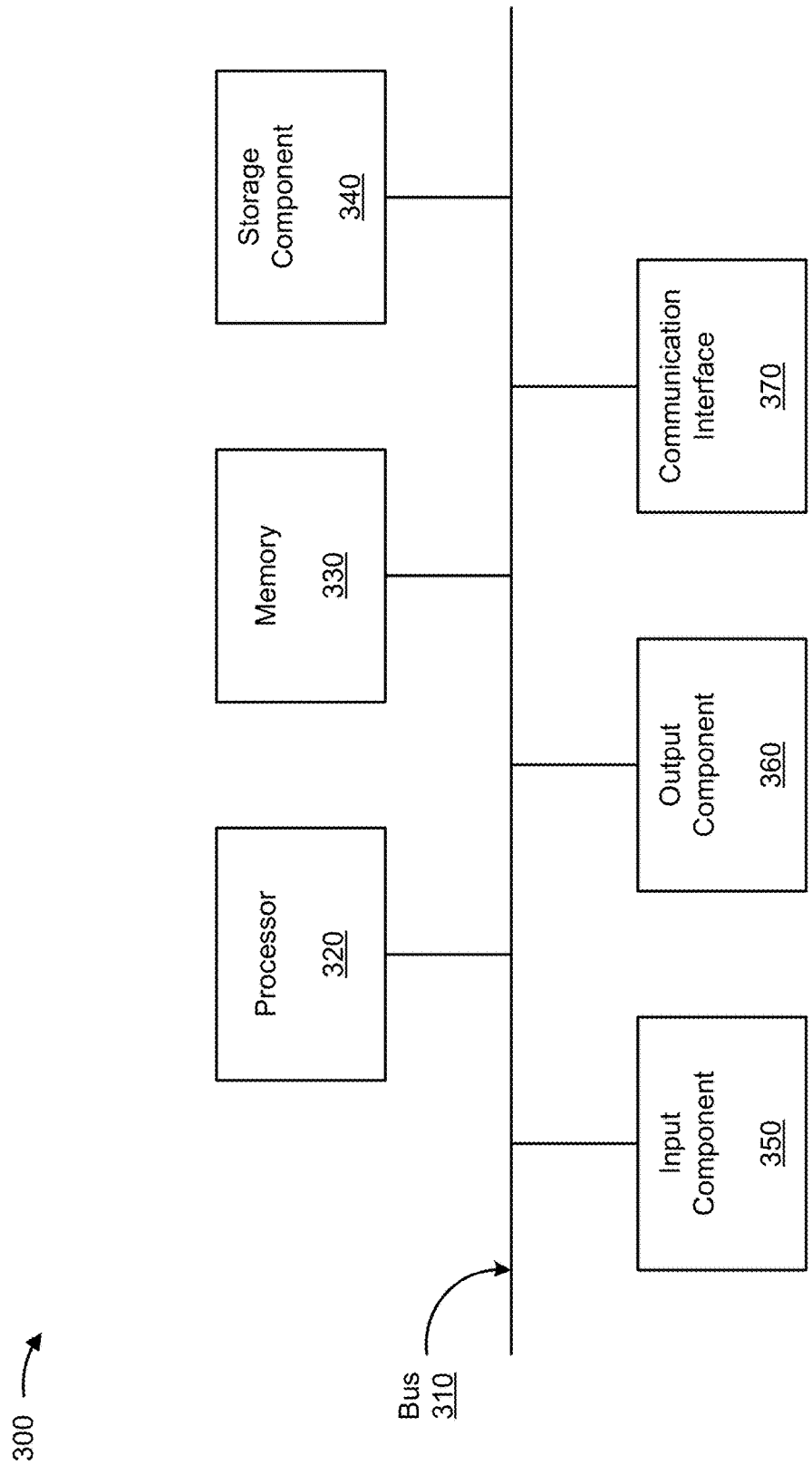
FIG. 3 is a diagram of example components of one or more devices of FIG. 2.

FIG. 3 is a diagram of example components of a device 300. Device 300 may correspond mobile device 205, base station 210, MME 215; SGW 220; PGW 225; subscription manager device 230; security device 235; HSS 240; AAA 245, and/or one or more devices included in network 250. In some implementations mobile device 205, base station 210, MME 215; SGW 220; PGW 225; subscription manager device 230; security device 235; HSS 240; AAA 245, and/or one or more devices included in network 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for accessing a private network associated with a mobile network when on another mobile network. In some implementations, one or more process blocks of FIG. 4 may be performed by a PGW (e.g., PGW 225). In some implementations, one or more process blocks of FIG. 4 may be performed by another device or a group of devices separate from or including the PGW, such as a mobile device (e.g., mobile device 205), a base station (e.g., base station 210), an MME (e.g., MME 215), an SGW (e.g., SGW 220), a subscription manager device (e.g., subscription manager device 230), a security device (e.g., security device 235), and/or the like.

As shown in FIG. 4, process 400 may include determining whether a mobile device is associated with a first identifier that is associated with a first mobile network based on determining that a second identifier associated with the mobile device is associated with a second mobile network, wherein the first identifier provides authorization for the mobile device to access a private network associated with the first mobile network (block 410). For example, the PGW (e.g., using processor 320, memory 330, storage component 340, and/or the like) may determine whether a mobile device is associated with a first identifier that is associated with a first mobile network based on determining that a second identifier associated with the mobile device is associated with a second mobile network, as described above in connection with FIGS. 1A-1J. In some implementations, the first identifier provides authorization for the mobile device to access a private network associated with the first mobile network.

As further shown in FIG. 4, process 400 may include transmitting, based on determining that the mobile device is associated with the first identifier, a security challenge to the mobile device (block 420). For example, the PGW (e.g., using processor 320, memory 330, storage component 340, output component 360, communication interface 370, and/or the like) may transmit, based on determining that the mobile device is associated with the first identifier, a security challenge to the mobile device, as described above in connection with FIGS. 1A-1J.

As further shown in FIG. 4, process 400 may include determining, based on receiving a response to the security challenge from the mobile device, whether the response to the security challenge satisfies the security challenge (block 430). For example, the PGW (e.g., using processor 320, memory 330, storage component 340, and/or the like) may determine, based on receiving a response to the security challenge from the mobile device, whether the response to the security challenge satisfies the security challenge, as described above in connection with FIGS. 1A-1J.

As further shown in FIG. 4, process 400 may include providing, based on determining that the response to the security challenge satisfies the security challenge, the mobile device with access to the private network (block 440). For example, the PGW (e.g., using processor 320, memory 330, storage component 340, input component 350, output component 360, communication interface 370, and/or the like) may provide, based on determining that the response to the security challenge satisfies the security challenge, the mobile device with access to the private network, as described above in connection with FIGS. 1A-1J.

Process 400 may include additional implementations, such as any single implementation or any combination of implementations described below and/or described with regard to any other process described herein.

In some implementations, the first identifier may be a first international mobile subscriber identity (IMSI), and the second identifier may be a second IMSI. In some implementations, when determining whether the mobile device is associated with the first identifier, the PGW may identify, in a subscription manager secure routing (SM-SR) device, information associating the first identifier with the second identifier.

In some implementations, the security challenge may include an instruction to provide a security credential associated with the mobile device. In some implementations, the security credential may include an electronic security certificate stored in an embedded universal integrated circuit card (eUICC) on the mobile device, an electronic security token stored in the eUICC on the mobile device, and/or an electronic security key stored in the eUICC on the mobile device.

In some implementations, the security credential may be generated by a security component included in the first mobile network and provided to the mobile device while the mobile device is communicatively connected with a base station included in the first mobile network. In some implementations, when receiving the response to the security challenge, the PGW may receive the security credential from the mobile device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for accessing a private network associated with a mobile network when on another mobile network. In some implementations, one or more process blocks of FIG. 5 may be performed by a PGW (e.g., PGW 225). In some implementations, one or more process blocks of FIG. 5 may be performed by another device or a group of devices separate from or including the PGW, such as a mobile device (e.g., mobile device 205), a base station (e.g., base station 210), an MME (e.g., MME 215), an SGW (e.g., SGW 220), a subscription manager device (e.g., subscription manager device 230), a security device (e.g., security device 235), and/or the like.

As shown in FIG. 5, process 500 may include determining that a first identifier, associated with a mobile device, is associated with a second mobile network (block 510). For example, the PGW (e.g., using processor 320, memory 330, storage component 340, and/or the like) may determine that a first identifier, associated with a mobile device, is associated with a second mobile network, as described above in connection with FIGS. 1A-1J.

As further shown in FIG. 5, process 500 may include determining, based on determining that the first identifier is associated with the second mobile network, whether the mobile device is associated with a second identifier that is associated with a mobile network (block 520). For example, the PGW (e.g., using processor 320, memory 330, storage component 340, and/or the like) may determine, based on determining that the first identifier is associated with the second mobile network, whether the mobile device is associated with a second identifier that is associated with a first mobile network, as described above in connection with FIGS. 1A-1J.

As further shown in FIG. 5, process 500 may include determining, based on determining that the mobile device is associated with the second identifier, whether the mobile device is authorized to access a private network associated with the first mobile network (block 530). For example, the PGW (e.g., using processor 320, memory 330, storage component 340, and/or the like) may determine, based on determining that the mobile device is associated with the second identifier, whether the mobile device is authorized to access a private network associated with the first mobile network, as described above in connection with FIGS. 1A-1J.

As further shown in FIG. 5, process 500 may include transmitting, based on determining that the mobile device is authorized to access the private network, a security challenge to the mobile device (block 540). For example, the PGW (e.g., using processor 320, memory 330, storage component 340, output component 360, communication interface 370, and/or the like) may transmit, based on determining that the mobile device is authorized to access the private network, a security challenge to the mobile device, as described above in connection with FIGS. 1A-1J.

As further shown in FIG. 5, process 500 may include determining, based on receiving a response to the security challenge from the mobile device, whether the response to the security challenge satisfies the security challenge (block 550). For example, the PGW (e.g., using processor 320, memory 330, storage component 340, and/or the like) may determine, based on receiving a response to the security challenge from the mobile device, whether the response to the security challenge satisfies the security challenge, as described above in connection with FIGS. 1A-1J.

As further shown in FIG. 5, process 500 may include providing, based on determining that the response to the security challenge satisfies the security challenge, the mobile device with access to the private network (block 560). For example, the PGW (e.g., using processor 320, memory 330, storage component 340, input component 350, output component 360, communication interface 370, and/or the like) may provide, based on determining that the response to the security challenge satisfies the security challenge, the mobile device with access to the private network, as described above in connection with FIGS. 1A-1J.

Process 500 may include additional implementations, such as any single implementation or any combination of implementations described below and/or described with regard to any other process described herein.

In some implementations, when receiving the response to the security challenge, the PGW may receive, from the mobile device, a first security credential associated with the mobile device. In some implementations, determining whether the response to the security challenge satisfies the security challenge may include determining whether the first security credential associated with the mobile device matches a second security credential stored in a security component included in the first mobile network. In some implementations, when providing the mobile device with access to the private network, the PGW may provide the mobile device with access to the private network based on determining that the first security credential associated with the mobile device matches the second security credential stored in the security component.

In some implementations, when receiving the response to the security challenge, the PGW may receive, from the mobile device, a security credential associated with the mobile device. In some implementations, the security credential may be generated based on an embedded universal integrated circuit card (eUICC) identifier associated with an eUICC on the mobile device, the first identifier, and/or the second identifier.

In some implementations, determining whether the mobile device is authorized to access the private network may include determining whether the second identifier, associated with the mobile device, is authorized to use an APN associated with the PGW. In some implementations, determining whether the second identifier, associated with the mobile device, is authorized to use the APN may include determining, based on subscription information included in a subscription manager secure routing (SM-SR) device, whether the second identifier is authorized to use the APN.

In some implementations, transmitting the security challenge to the mobile device may include transmitting, to the mobile device, an instruction to provide a security credential. In some implementations, the security credential may be generated by a security component included in the first mobile network and provided to the mobile device while the mobile device is communicatively connected with a base station included in the first mobile network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for accessing a private network associated with a mobile network when on another mobile network. In some implementations, one or more process blocks of FIG. 6 may be performed by a PGW (e.g., PGW 225). In some implementations, one or more process blocks of FIG. 6 may be performed by another device or a group of devices separate from or including the PGW, such as a mobile device (e.g., mobile device 205), a base station (e.g., base station 210), an MIME (e.g., MME 215), an SGW (e.g., SGW 220), a subscription manager device (e.g., subscription manager device 230), a security device (e.g., security device 235), and/or the like.

As shown in FIG. 6, process 600 may include receiving, from a mobile device, a request to access a private network associated with a first mobile network, wherein the mobile device is communicatively connected with a second mobile network (block 610). For example, the PGW (e.g., using processor 320, memory 330, storage component 340, input component 350, communication interface 370, and/or the like) may receive, from a mobile device, a request to access a private network associated with a first mobile network, as described above in connection with FIGS. 1A-1J. In some implementations, the mobile device may be communicatively connected with a second mobile network.

As further shown in FIG. 6, process 600 may include determining, based on receiving the request, whether a first identifier, associated with the mobile device, is associated with the first mobile network (block 620). For example, the PGW (e.g., using processor 320, memory 330, storage component 340, and/or the like) may determine, based on receiving the request, whether a first identifier, associated with the mobile device, is associated with the first mobile network, as described above in connection with FIGS. 1A-1J.

As further shown in FIG. 6, process 600 may include determining, based on determining that the first identifier is not associated with the first mobile network, whether the first identifier is associated with a second identifier that is associated with the mobile device and the first mobile network (block 630). For example, the PGW (e.g., using processor 320, memory 330, storage component 340, and/or the like) may determine, based on determining that the first identifier is not associated with the first mobile network, whether the first identifier is associated with a second identifier that is associated with the mobile device and the first mobile network, as described above in connection with FIGS. 1A-1J.

As further shown in FIG. 6, process 600 may include determining, based on determining that the second identifier is associated with the mobile device and the first mobile network, whether the mobile device is authorized to access the private network (block 640). For example, the PGW (e.g., using processor 320, memory 330, storage component 340, and/or the like) may determine, based on determining that the second identifier is associated with the mobile device and the first mobile network, whether the mobile device is authorized to access the private network, as described above in connection with FIGS. 1A-1J.

As further shown in FIG. 6, process 600 may include transmitting, based on determining that the mobile device is authorized to access the private network, a security challenge to the mobile device (block 650). For example, the PGW (e.g., using processor 320, memory 330, storage component 340, output component 360, communication interface 370, and/or the like) may transmit, based on determining that the mobile device is authorized to access the private network, a security challenge to the mobile device, as described above in connection with FIGS. 1A-1J.

As further shown in FIG. 6, process 600 may include determining, based on receiving a response to the security challenge from the mobile device, whether the response to the security challenge satisfies the security challenge (block 660). For example, the PGW (e.g., using processor 320, memory 330, storage component 340, and/or the like) may determine, based on receiving a response to the security challenge from the mobile device, whether the response to the security challenge satisfies the security challenge, as described above in connection with FIGS. 1A-1J.

As further shown in FIG. 6, process 600 may include providing, based on determining that the response to the security challenge satisfies the security challenge, the mobile device with access to the private network (block 670). For example, the PGW (e.g., using processor 320, memory 330, storage component 340, input component 350, output component 360, communication interface 370, and/or the like) may provide, based on determining that the response to the security challenge satisfies the security challenge, the mobile device with access to the private network, as described above in connection with FIGS. 1A-1J.

Process 600 may include additional implementations, such as any single implementation or any combination of implementations described below and/or described with regard to any other process described herein.

In some implementations, when determining whether the first identifier assigned to the mobile device is associated with the first mobile network, the PGW may determine whether the first identifier assigned to the mobile device is associated with the first mobile network based on a mobile country code identified in the first identifier, a mobile network code identified in the first identifier, and/or a mobile subscription identification number identified in the first identifier.

In some implementations, the response to the security challenge may include a security credential. In some implementations, the security credential may be generated by a security component included in the first mobile network and provided to the mobile device while the mobile device is communicatively connected with a base station included in the first mobile network. In some implementations, the security credential may be generated based on an embedded universal integrated circuit card (eUICC) identifier associated with an eUICC on the mobile device, the first identifier, and/or the second identifier.

In some implementations, the security challenge may include an instruction to provide a security credential associated with the mobile device. In some implementations, the security credential may be stored in an embedded universal integrated circuit card (eUICC) on the mobile device. In some implementations, the security credential may include a security key, a security token, and/or a security certificate.

In some implementations, the PGW may identify the first identifier based on information stored in an issuer security domain profile (ISD-P) stored in an embedded universal integrated circuit card (eUICC) on the mobile device. In some implementations, the PGW may identify the second identifier based on information stored in a subscription manager secure routing (SM-SR) device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, PGW 225 may provide the mobile device with access to the private network when mobile device 205 includes an eUICC, or another component, that allows mobile device 205 to switch between a plurality of identifiers associated with mobile device 205.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, to:
        determine that a mobile device is associated with a first identifier that is associated with a first mobile network based on receiving a request of the mobile device to access a private network associated with the first mobile network using a second identifier associated with a second mobile network and determining that the second identifier does not provide authorization to access the private network,
            wherein the first identifier provides authorization for the mobile device to access the private network,
            wherein the mobile device is communicatively coupled to the second mobile network using the second identifier;
        transmit, based on determining that the mobile device is associated with the first identifier, a security challenge to the mobile device;
        determine, based on receiving a response to the security challenge from the mobile device, whether the response to the security challenge satisfies the security challenge; and
        provide, based on determining that the response to the security challenge satisfies the security challenge, the mobile device with access to the private network.

2. The device of claim 1, wherein the first identifier is a first international mobile subscriber identity (IMSI), and wherein the second identifier is a second IMSI.

3. The device of claim 1, wherein the one or more processors, when determining that the mobile device is associated with the first identifier, are to:
    identify, in a subscription manager secure routing (SM-SR) device, information associating the first identifier with the second identifier.

4. The device of claim 1, wherein the security challenge includes an instruction to provide a security credential associated with the mobile device.

5. The device of claim 4, wherein the security credential is at least one of:
    an electronic security certificate stored in an embedded universal integrated circuit card (eUICC) on the mobile device,
    an electronic security token stored in the eUICC on the mobile device, or
    an electronic security key stored in the eUICC on the mobile device.

6. The device of claim 4, wherein the security credential is generated by a security component included in the first mobile network and provided to the mobile device while the mobile device is communicatively connected with a base station included in the first mobile network.

7. The device of claim 4, wherein the one or more processors, when receiving the response to the security challenge, are to:
    receive the security credential from the mobile device.

8. A method, comprising:
    determining, by a device included in a first mobile, network, that a first identifier, associated with a mobile device, is associated with a second mobile network;
    determining, by the device and based on receiving a request of the mobile device to access a private network associated with a first mobile network using the first identifier and determining that the first identifier does not provide authorization to access the private network, that the mobile device is associated with a second identifier that is associated with the first mobile network;
    determining, by the device and based on determining that the mobile device is associated with the second identifier, that the mobile device is authorized to access the private network associated with the first mobile network;
    wherein the second identifier provides authorization for the mobile device to access the private network, and
    wherein the mobile device is communicatively coupled to the second mobile network using the first identifier
transmitting, by the device and based on determining that the mobile device is authorized to access the private network, a security challenge to the mobile device;
determining, by the device and based on receiving a response to the security challenge from the mobile device, whether the response to the security challenge satisfies the security challenge; and
providing, by the device and based on determining that the response to the security challenge satisfies the security challenge, the mobile device with access to the private network.

9. The method of claim 8, wherein receiving the response to the security challenge comprises:
receiving, from the mobile device, a first security credential associated with the mobile device; and
    wherein determining whether the response to the security challenge satisfies the security challenge comprises:
        determining whether the first security credential associated with the mobile device matches a second security credential stored in a security component included in the first mobile network.

10. The method of claim 9, wherein providing the mobile device with access to the private network comprises:
providing the mobile device with access to the private network based on determining that the first security credential associated with the mobile device matches the second security credential stored in the security component.

11. The method of claim 8, wherein receiving the response to the security challenge comprises:
receiving, from the mobile device, a security credential associated with the mobile device,
    wherein the security credential is generated based on at least one of:
        an embedded universal integrated circuit card (eUICC) identifier associated with an eUICC on the mobile device,
        the first identifier, or
        the second identifier.

12. The method of claim 8, wherein determining that the mobile device is authorized to access the private network comprises:
determining whether the second identifier, associated with the mobile device, is authorized to use an access point name (APN) associated with the device.

13. The method of claim 12, wherein determining whether the second identifier, associated with the mobile device, is authorized to use the APN comprises:
determining, based on subscription information included in a subscription manager secure routing (SM-SR) device, whether the second identifier is authorized to use the APN.

14. The method of claim 8, wherein transmitting the security challenge to the mobile device comprises:
transmitting, to the mobile device, an instruction to provide a security credential,
    wherein the security credential is generated by a security component included in the first mobile network and provided to the mobile device while the mobile device is communicatively connected with a base station included in the first mobile network.

15. A non-transitory computer-readable medium storing instructions, the instructions comprising:
one or more instructions that, when executed by one or more processors of a device, cause the one or more processors to:
    receive, from a mobile device, a request to access a private network associated with a first mobile network using a first identifier associated with a second mobile network,
        wherein the mobile device is communicatively connected with the second mobile network using the first identifier;
    determine, based on receiving the request, that the first identifier, associated with the mobile device, is associated with the first mobile network,
        wherein the second identifier provides authorization for the mobile device to access the private network;
    determine, based on receiving a request of the mobile device to access the private network using the first identifier and determining that the first identifier does not provide authorization for the mobile device to access the private network, that the first identifier is associated with a second identifier that is associated with the mobile device and provides authorization for the mobile device to access the private network associated with the first mobile network,
        wherein the one or more instructions, that cause the one or more processors to determine that the first identifier assigned to the mobile device is associated with the second identifier, cause the one or more processors to:
            access information that identifies that the first identifier and the second identifier are stored in a same embedded universal integrated circuit card (eUICC) on the mobile device, and
            determine, based on information that identifies that the first identifier and the second identifier are stored in the same eUICC, that the first identifier is associated with the second identifier;
    determine, based on determining that the second identifier is associated with the mobile device and the first mobile network, that the mobile device is authorized to access the private network;
    transmit, based on determining that the mobile device is authorized to access the private network, a security challenge to the mobile device;
    determine, based on receiving a response to the security challenge from the mobile device, whether the response to the security challenge satisfies the security challenge; and
    provide, based on determining that the response to the security challenge satisfies the security challenge, the mobile device with access to the private network.

16. The non-transitory computer-readable medium of claim 15, wherein the one or more instructions, that cause the one or more processors to determine that the first identifier assigned to the mobile device is associated with the first mobile network, cause the one or more processors to:
determine that the first identifier assigned to the mobile device is associated with the first mobile network based on at least on one of:

a mobile country code identified in the first identifier,
a mobile network code identified in the first identifier, or
a mobile subscription identification number identified in the first identifier.

17. The non-transitory computer-readable medium of claim 15, wherein the response to the security challenge includes a security credential,
wherein the security credential is generated by a security component included in the first mobile network and provided to the mobile device while the mobile device is communicatively connected with a base station included in the first mobile network, and
wherein the security credential is generated based on at least one of:
an eUICC identifier associated with the eUICC on the mobile device,
the first identifier, or
the second identifier.

18. The non-transitory computer-readable medium of claim 15, wherein the security challenge includes an instruction to provide a security credential associated with the mobile device,
wherein the security credential is stored in an embedded universal integrated circuit card (eUICC) on the mobile device, and
wherein the security credential includes at least one of:
a security key,
a security token, or
a security certificate.

19. The non-transitory computer-readable medium of claim 15, wherein the one or more instructions further cause the one or more processors to:
identify the first identifier based on information stored in an issuer security domain profile (ISD-P) stored in an embedded universal integrated circuit card (eUICC) on the mobile device.

20. The non-transitory computer-readable medium of claim 15, wherein the one or more instructions further cause the one or more processors to:
identify the second identifier based on information stored in a subscription manager secure routing (SM-SR) device.

* * * * *